Jan. 24, 1956   J. H. SEBALD   2,732,259
DISTRIBUTION NOZZLE
Filed Oct. 13, 1953

JOSEPH H. SEBALD
*INVENTOR.*

BY
atty

United States Patent Office 2,732,259
Patented Jan. 24, 1956

2,732,259
DISTRIBUTION NOZZLE

Joseph H. Sebald, Arlington, N. J.

Application October 13, 1953, Serial No. 385,873

6 Claims. (Cl. 299—141)

This invention relates to distribution nozzles and more particularly to such nozzles adapted for use in the under drain systems of pressure water filters or in analogous apparatus wherein it is necessary to protect the nozzle outlets from clogging by material resting upon the nozzle tops, such as filter bed material in pressure filters.

An object of the present invention is to provide a method of manufacturing nozzles of this type together with a novel construction of the nozzle per se which results in a practical nozzle of much less production cost as well as being of greater corrosion resistance than nozzles now on the market.

With these and other objects in view, as may appear from the accompanying specification, the invention consists of various features of construction and combination of parts, which will be first described in connection with the accompanying drawings, showing a distribution nozzle of a preferred form embodying the invention, and the features forming the invention will be specifically pointed out in the claims.

Figure 1:
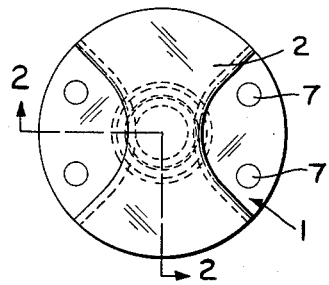
Figure 1 is a top plan of the nozzle.

While the improved nozzle forming the subject matter of the present invention is particularly adapted for use in the under drain systems of pressure water filters, it is to be understood that it has many other uses wherein it is desirable to distribute a fluid or liquid into a container, when the nozzles are imbedded in various types of material such as the filter bed material in pressure filters or in other instances where it is desirable that the fluid be ejected laterally from the nozzles.

In the form of the invention shown in Figures 1 to 4 inclusive of the drawings, the nozzle includes the outer or upper nozzle plate 1 which is stamped of any suitable type of sheet metal, preferably of stainless steel or other non-corrosive metal and it is stamped or cut from a sheet of metal and simultaneously with its stamping or cutting portions thereof are offset laterally of the disc as indicated at 2. In this form of the invention the laterally offset portions 2 are diametrically opposite to each other from the axis of the disc 1 and curve outwardly from the axis of the disc to provide, when the nozzle is assembled fluid passages of gradually increasing cross-sectional area from the axis of the disc outwardly to the perimeter of the disc. A second disc 3 is also stamped from suitable sheet metal of the same type from which the disc 1 is stamped. Simultaneously with the stamping or cutting out of the disc 3 this disc is punctured axially to provide an axial opening and an annular flange 4 which surrounds the opening and projects laterally from the disc 3. After the discs 1 and 3 are stamped out as above specified they are attached to each other with the offset portions extending outwardly in the opposite direction to the manner in which the flange 4 extends laterally from the disc 3 so as to provide the fluid passages indicated at 5 between the two discs, which fluid passages open into the axial opening 6 formed in the disc 3. The discs are then spot-welded one to the other as indicated at 7 or otherwise suitably permanently attached one to the other. Such attachment may be by brazing, soldering or any other well known method of rigidly and permanently attaching one disc to the other. After the discs 1 and 3 are permanently attached one to the other, a nipple 8 is placed with one end in engagement with the side of the disc 3 opposite to the offset portions 2 of the disc 1 and with the annular flange 4 extending into the bore 9 of the nipple 8. The nipple is then soldered, welded or otherwise permanently attached to the disc 3 which completes the construction of the nozzle.

Figure 5:
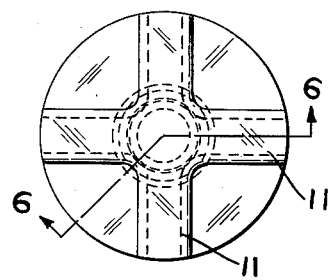
Figure 5 is a top plan of a modified form of the nozzle.
Figure 2:
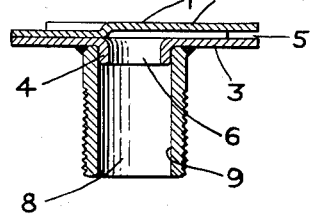
Figure 2 is a vertical section through the nozzle taken on the line 2—2 of Figure 3.
Figure 6:
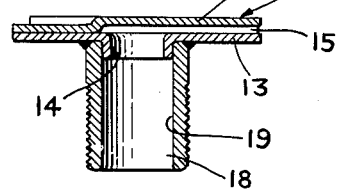
Figure 6 is a vertical section taken on the line 6—6 of Figure 5.
Figure 3:
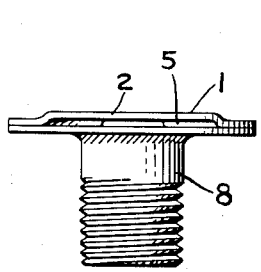
Figure 3 is a side elevation of the nozzle.

Figures 5 and 6 show a slight modification of the improved nozzle. In this construction the disc 10 has a plurality of offset portions 11 formed thereon which radiate from the axis of the disc. These offset portions 11, however, have straight sides so that the fluid passages 15 formed between the discs 10 and 13 are of equal cross-sectional area from their inner ends to their outer outlet ends. As in the form shown in Figures 1 to 4 the fluid passages 15 open out through the perimeter of the assembled disc structure. The discs 11 ad 13 are permanently attached one to the other in any suitable manner such as by spot-welding, brazing or the like, and the nipple 18 is soldered, welded, or otherwise suitably attached to the disc 13 with the collar 14 extending into the bore 19 of the nipple 18. Like in the construction shown in Figures 1 to 4 of the drawings the bore 19 of the nipple 18 opens through the annular flange 4 into the fluid passages 15 and thus fluid which enters the nozzle structure through the nipples 8 or 18 is discharged laterally through the perimeter of the assembled discs and the discharge openings of the fluid passages are protected from clogging by any material which might rest upon the outer surface of the outer discs 1 or 11.

Figure 7:
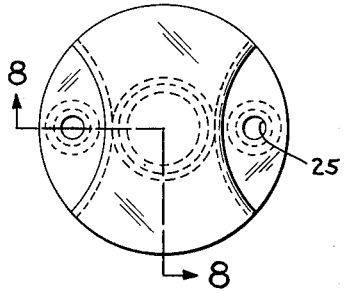
Figure 7 is a top plan of a further modified form of the nozzle.
Figure 8:
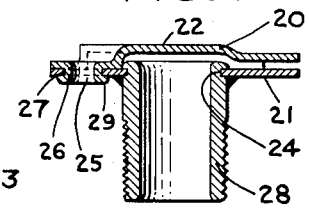
Figure 8 is a vertical section taken on the line 8—8 of Figure 7.

In the modified construction shown in Figures 7 and 8 of the drawings two discs 20 and 21 are stamped out of sheet metal the same as in the construction shown in Figures 1 to 4 and 5 and 6 and the disc 20 is provided with laterally offset portions 22 which, when the two discs 20 and 21 are attached one to the other form the flow passages between the discs which open out laterally through the perimeters of the discs. In the forms shown in Figures 7 and 8 of the drawings, however, the disc 21 which corresponds to the discs 3 and 13, does not have the lateral collar formed thereon but the nipple 28 has an annular groove 24 formed in its outer surface near one end thereof and the disc 21 is sprung into this annular groove as clearly shown in Figure 8 of the drawings after which the nipple is soldered, welded or otherwise suitably attached to the disc 21. The disc 20, however, has a plurality of openings 25 punched therethrough forming laterally extending flanges 26 and these flanges 26 are inserted through corresponding receiving openings 27 formed in the disc 21. The flanges 26 are then crimped as shown at 29 to securely connect the flange 20 to the flange 21.

Figure 9:
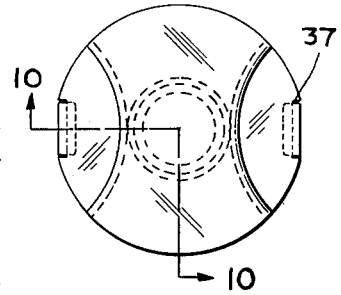
Figure 9 is a top plan view of still another modified form of the nozzle.
Figure 4:
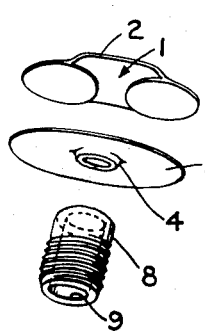
Figure 4 is a perspective view of the nozzle elements showing them in an exploded position.
Figure 10:
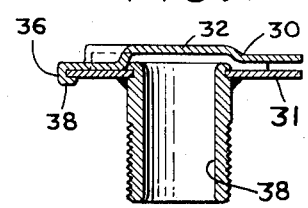
Figure 10 is a vertical section taken on the line 10—10 of Figure 9.

In the form of the invention shown in Figures 9 and 10 of the drawings, the discs 30 and 31 are stamped from sheet metal and the disc 30 has laterally offset portions 32 formed thereon which when the discs 30 and 31 are connected one to the other form the fluid passages between the discs which radiate outwardly from the axis of the discs and open laterally through the perimeter of the assembled discs. The assembled discs 30 and 31 are connected to the nipple 38 in the same manner in which the nipple 28 is connected to the assembled discs 20 and 21. However, in the construction of the disc 30 there is a slight alteration, namely, the disc 30 is provided with tongues 36 at suitably spaced positions about its perimeter while the disc 31 has notches or cut out portions 37 formed in its perimeter corresponding to the location of the tongues 36. The tongues 36 are bent downwardly and crimped as shown at 38 to securely connect the discs 30 and 31 one to the other.

It will be understood that the invention is not to be limited to the specific construction or arrangement of parts shown, but that they may be widely modified within the invention defined by the claims.

What is claimed is:

1. A distribution nozzle comprising a pair of flat discs lying in flat face engagement with each other, one of said discs provided with an opening therethrough at its axis, the other of said discs having a portion thereof offset laterally from its axis to its perimeter to form a fluid passage forming space between the discs communicating with the axial opening in the other disc and opening out at the perimeter of the discs, a nipple attached to and extending laterally from said disc and provided with the axial opening and communicating with the axial opening in said disc, and means attaching said discs in flat engagement one to the other.

2. A distribution nozzle as claimed in claim 1 wherein said offset portion extends diametrically across said disc and has its side walls concavely curved with the minimum transverse dimension at the axis of the disc and its maximum transverse dimension at the perimeter of the disc, thereby forming diverging fluid passages between the discs of gradually increasing cross-sectional area from the axis of the disc to their perimeters.

3. A distribution nozzle as claimed in claim 1 wherein a laterally protruding flange is formed on said second disc about said axial opening, said flange extending into the bore of said nipple.

4. A distribution nozzle as claimed in claim 1 wherein said discs are spotwelded one to the other and said second disc is soldered to said nipple.

5. A distribution nozzle as claimed in claim 1 wherein said outer disc has portions thereof bent and crimped into engagement with said second disc to connect the discs assembled one to the other.

6. A distribution nozzle as claimed in claim 1 wherein a plurality of offset portions are formed in said outer disc all radiating from the axis of the disc.

References Cited in the file of this patent

UNITED STATES PATENTS

| | | |
|---|---|---|
| 1,612,964 | Brewer | Jan. 4, 1927 |
| 1,646,299 | Mandry | Oct. 18, 1927 |
| 2,073,187 | Webb | Mar. 9, 1937 |
| 2,273,830 | Brierly | Feb. 24, 1942 |
| 2,473,035 | Meade | June 14, 1949 |
| 2,550,100 | Voss | Apr. 24, 1951 |
| 2,583,176 | Hautau | Jan. 22, 1952 |
| 2,661,984 | Peebles | Dec. 8, 1953 |